Oct. 31, 1950 L. THOMPSON ET AL 2,528,459

APPARATUS FOR INDICATING THAT TELEPHONE CONVERSATION IS BEING RECORDED

Filed Sept. 6, 1946 2 Sheets-Sheet 1

INVENTORS
LINCOLN THOMPSON
DONALD F. BALMER
BY H. G. Manning
ATTORNEY

Oct. 31, 1950 L. THOMPSON ET AL 2,528,459

APPARATUS FOR INDICATING THAT TELEPHONE CONVERSATION IS BEING RECORDED

Filed Sept. 6, 1946 2 Sheets-Sheet 2

INVENTORS
LINCOLN THOMPSON
DONALD F. BALMER
BY
H. G. Manning
ATTORNEY

Patented Oct. 31, 1950 2,528,459

UNITED STATES PATENT OFFICE 2,528,459

APPARATUS FOR INDICATING THAT TELEPHONE CONVERSATION IS BEING RECORDED

Lincoln Thompson, Cheshire, and Donald F. Balmer, New Haven, Conn., assignors to The Soundscriber Corporation, New Haven, Conn., a corporation of Connecticut Application September 6, 1946, Serial No. 695,206

6 Claims. (Cl. 179—6)

This invention relates to an apparatus for recording telephone conversations on a phonographic record, and more particularly to a dictating machine having means for connection with a telephone circuit for indicating audibly to all parties using the line that the conversation is being recorded.

One object of the present invention is to provide an apparatus of the above nature in which the fact that the telephone conversation is being recorded is indicated by means of a signal such as a musical tone or sequence of tones making a "tune" which may be repeated at periodic intervals as long as the telephone conversation is being recorded.

A further object is to provide an apparatus of the above nature in which the dictating machine will automatically be restored to condition for normal recording by the act of returning the telephone set to the hook, or by the manual operation of a stop button.

A further object is to provide a characteristic warning signal which may be easily recognized and yet will not interfere with the telephone conversation.

A further object is to provide an audible telephone recording indicator of the above nature, which when connected to the telephone circuit will not introduce any appreciable load therein.

A further object is to furnish a direct connection unit between a telephone line and a dictating machine which can be leased by a telephone company to a subscriber for use with any standard type of electronic recorder.

A further object is to provide an apparatus of the above nature in which the audible warning signal will be applied to the telephone line circuit only at such moments as recording is actually being done, and at other times will disappear from the line.

A further object is to provide an apparatus of the above nature in which the interconnection between the signal unit and the sound recorder will be a simple 6-wire cable employing two wires for the voice current, two wires for controlling the start and stop of the record propulsion mechanism, and two wires for the warning signal circuit.

A further object is to provide an apparatus of the above nature in which the telephone recording may be started by the same switch that controls the voice currents and the warning signal.

A further object is to provide an apparatus of the above nature in which the switching from normal dictation recording to telephone recording may be accomplished by a simple manual operation, and the resumption to normal recording conditions will take place automatically when telephone recording has ceased, without need for further switching.

A further object is to provide an apparatus of the above nature which will be simple in construction, inexpensive to manufacture, easy to install and manipulate, compact, ornamental in appearance, and very efficient and durable in use.

With these and other objects in view, there have been illustrated on the accompanying drawings three forms in which the invention may conveniently be embodied in practice.

Important telephone conversations in the past have generally been taken down in shorthand by stenographers, who sometimes were unable to keep up with the speed of the persons talking, with the result that some of the conversation was lost.

Since the introduction of modern electronic amplifiers, dictating machines having attachments for recording telephone conversations have come into wide use for legitimate commercial and governmental purposes—generally being provided with additional means for equalizing the volume of the near and far ends of the telephone line to produce uniform recording.

The recording of telephone conversations has proven exceedingly useful in preserving confirmatory records of the details of contracts, purchase orders, inventories, sales reports, etc., and was employed to a large extent during World War II to make permanent and accurate records of long distance conferences, news calls, etc., as well as to record frequent changes made in Army and Navy specifications for the guidance of the manufacturers concerned.

In general use of telephone recorders, occasions arise frequently where all parties to the conversation wish to have notice that a recording is being made. Moreover, one or all of such parties may at times wish to converse "off the record," and to thereafter resume telephone recording or terminate it, with full knowledge of the parties. Furthermore, it is sometimes desirable to identify a sound record as having been recorded with full knoweledge of all parties.

By means of the present apparatus the above and other results may be readily achieved. Moreover, in compliance with the proposed regulations of the Federal Communications Commission, the apparatus herein disclosed may be used in conjunction with a plan of listing in telephone directories the names of all subscribers equipped with telephone recording devices.

Also, if desired, a supplemental voice announcement that telephone recording is taking place may be transmitted into the line by a suitable phonograph record or by the telephone operator.

In general, the improved apparatus herein disclosed for indicating that a telephone conversation is being recorded, consists essentially of a motor of sufficiently low current consumption that it will operate either from the telephone line current or from local low power dry cells; a set of plucked musical tuned iron reeds actuated by cams on the motor shaft to generate a group of successive tones at periodic intervals in an associated electrical coil; and a switch, preferably of the push button type, with start and stop buttons to control the telephone recording, and simultaneously to introduce the characteristic warning signal currents into the telephone line circuit and to operate the necessary relay and switching apparatus.

Figures 1, 2:
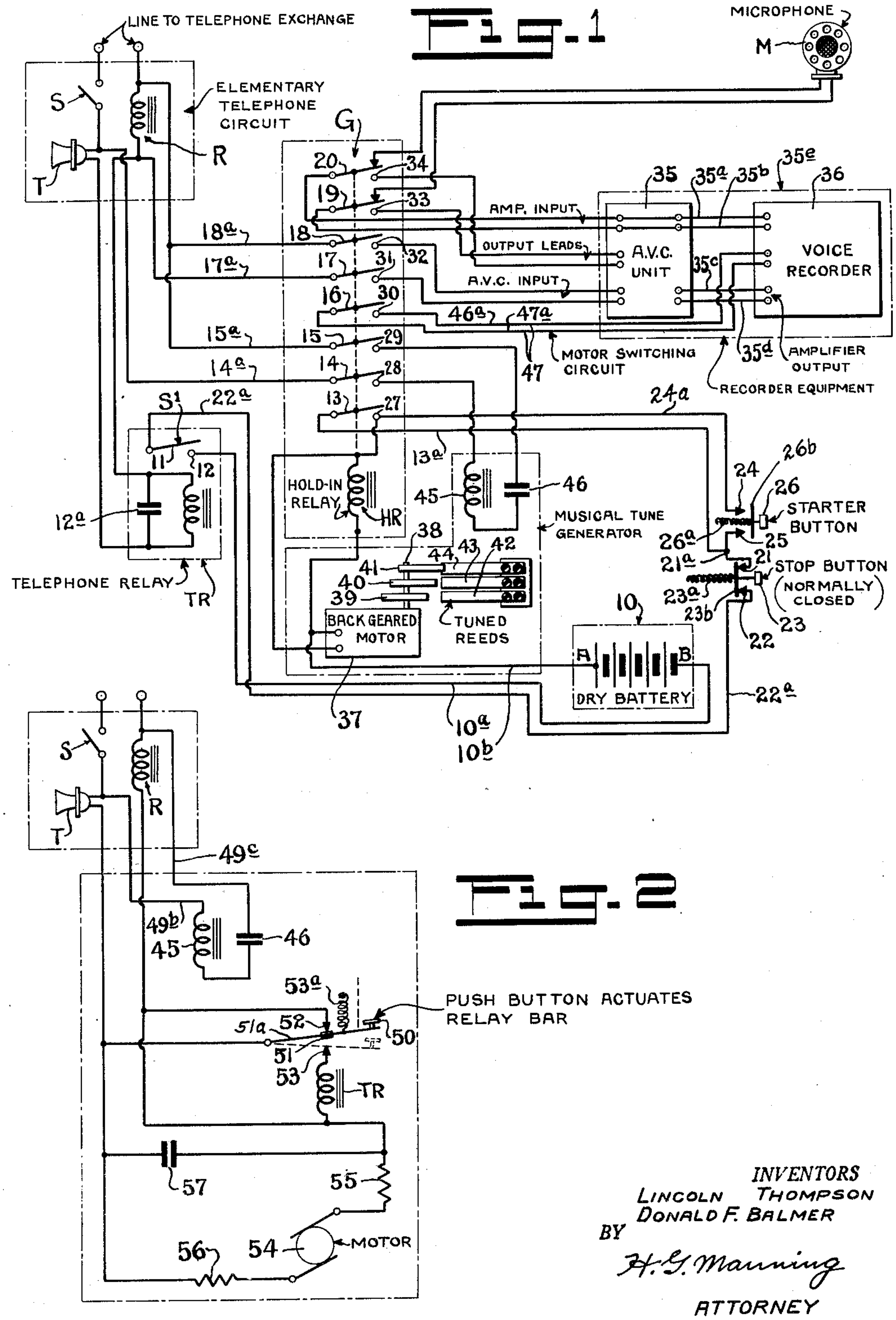
Fig. 1 represents a circuit diagram illustrating the first form of the telephone recording indicator apparatus embodying the present invention, and in which the current for operating the signal-generating motor is supplied from a local dry battery.
Fig. 2 is a circuit diagram, in simplified form, of a second form of the invention in which the warning signal current is derived from the telephone line without the use of local dry cells, and in which the signal generating motor is in parallel with the telephone relay coil.

Referring now to Fig. 1 of the drawings, in which like reference numerals denote corresponding parts throughout the several views, the numeral 10 indicates a local dry battery which is adapted to be connected by conductors 10*a*, 10*b* to a movable contact 11 and a fixed contact 12, respectively, of a telephone relay switch $S_1$.

Associated with the switch $S_1$, provision is made of a relay TR arranged in series with the telephone transmitter T, so that when the telephone receiver R is "off" the hook, thus closing the telephone switch S, battery current will flow through the coil of the relay TR, and will maintain closed the contacts 11 and 12 of the switch $S_1$. The coil of the relay TR is provided with a bypass condenser 12A, as shown, to allow the voice currents to pass without being impeded by the reactance of said coil.

Provision is also made of a multiple gang switch G having movable contacts 13, 14, 15, 16, 17, 18, 19, 20, said switch being held closed by a hold-in relay HR. The movable contact 13 of the "gang" switch is connected by a conductor 13*a* to a starter switch button 26, normally pressed into open condition by a compression coiled spring 26*a*. The movable contact 14 is connected by a conductor 14*a* to the switch S leading to one side of the telephone line.

The movable contact 15 is connected by a conductor 15*a* to the other side of the telephone line and to the receiver R. The movable contacts 17 and 18 of the gang switch are also connected by conductors 17*a*, 18*a* across the receiver R, as shown in Fig. 1.

Provision is also made of a normally closed "stops" switch having a pair of fixed contacts 21, 22, a "stop" button 23, and a bridging movable contact 23*b* normally held in closed condition by a compression coiled spring 23*a*. The contact 21 leads to a junction 21*a* connected by the wire 13*a* to the movable contact 13 of the switch G, while the contact 22 is connected by a conductor 22*a* to the movable contact 11 of the telephone relay switch $S_1$.

The "start" switch, which is located adjacent the "stop" switch, is provided with a "starter" button 26 and a normally open button-actuated movable bridging contact 26*b* adapted to connect a pair of fixed contacts 24, 25 when pushed in manually. The contact 25 leads to the junction 21*a*, as shown, while the contact 24 is connected by a conductor 24*a* to the fixed contact 27 of the "gang" switch G.

The movable contacts 13, 14, 15, 16, 17, 18, 19, 20, inclusive, of the gang switch G, are adapted to be swung in unison into and out of engagement with eight fixed contacts 27, 28, 29, 30, 31, 32, 33, and 34 by the operation of the hold-in relay HR when the starter button 26 is pressed.

Provision is also made of an automatic volume control "AVC" unit 35 such as was fully disclosed in a prior Patent No. 2,340,159 to Lincoln Thompson, dated January 25, 1944, entitled "Automatic Volume Control for Telephone Recording Apparatuses." This AVC unit 35 is connected by conductors 35*a*, 35*b* to the input of a voice recorder 36 of a standard recorder equipment 35*e*. The AVC unit 35 has a high impedance input and is connected by conductors 35*c* and 35*d* to the amplifier output of the voice recorder 36, which feeds the amplified signals back into the AVC unit where they exert a "compressive" action thereon.

The high impedance input of the AVC unit and the isolating condensers of said unit are designed to avoid any load or drain on the telephone circuit, across which it is bridged. Furthermore, the "compressive" action of the AVC unit has a levelling effect on the conversations at the far and near ends of the telephone line.

In order to impress an audible signal on the telephone line circuit during recording periods to indicate that the conversation is being recorded, provision is made of a low power electric motor 37 having back gears (not shown) which are drivingly connected to a shaft 38 upon which are mounted a plurality of reed-plucking cams (three in this instance) as indicated by the numerals 39, 40, 41.

The plucking cams 39, 40, 41, when rotated, are adapted to engage, in succession, a plurality of tuned iron reeds 42, 43, 44, which when plucked, impress characteristic electrical oscillations upon a musical tune generator coil 45 which is connected to the contacts 28, 29 through a suitable condenser 46.

The warning signal should preferably consist of a sequence of three tones of low intensity so as to remain in the background and of high pitch to produce an easily recognizable tune—one such sequence which works well being a short tone having a frequency of 600 cycles, followed in quick succession by a shorter tone having a frequency of 900 cycles, and by another tone of 600 cycles frequency of the same duration as the first tone. If the first and third tones have a duration about twice that of the second tone, a highly characteristic tune will result, simulating a chimes and imitating the three syllables of the word "recording." Such a tune will not be confusable with any other type of telephone signal. The whole tune should not require over one second, and will preferably be repeated every 15 seconds.

The condenser 46 serves to block any direct current from the dry battery 10 from reaching the coil 45, and the latter has a high impedance so as to prevent it from loading the voice current telephone circuit, and drawing current therefrom. For extra safety, the coil 45 is disconnected, when the recorder is out of use, as by the opening of the gang switch G.

The contacts 16 and 30 of the gang switch G are adapted to be connected by conductors 46a, 47a with a motor-switching circuit indicated by the numeral 47, which in turn is adapted to be connected to the voice recorder 36.

*Operation of first form*

In the operation of the first form of the invention, it will be assumed, for example, that the user is in the process of normal routine dictation, and that he wishes to record an incoming two-way telephone conversation.

For this purpose he may employ the same record which he already has started on his dictation recorder, or he may change the record for a special one for the telephone recording. In either case, when the telephone bell rings, he will lift the receiver R from the hook and answer the telephone in the usual manner. This operation will close the switch S and will energize the relay TR with current from the telephone line and cause said relay to close the switch $S_1$.

When the user determines that he wishes to record the telephone conversation, he will press the starter button 26, which will energize the hold-in relay HR, thus closing the gang switch G. This operation will connect the voice recorder 36 to the telephone circuit, and will also start the motor of the warning tune generator.

It will be understood that the coil of the relay HR will be energized by current from the dry battery 10, and will hold the movable contacts 13—20 of the gang switch G engaged with the fixed contacts 27—34 thereof, until said coil is deenergized by the restoration of the receiver R to its hook (which will open the switch S and deenergize the telephone relay TR), or by the depression of the "Stop" button 23, which will open the circuit directly.

When the switch G is open (as shown in Fig. 1), the microphone M will be connected through the AVC unit to the amplifier input of the voice recorder 36 for regular or normal dictation recording.

When the gang switch G is closed, the movable contacts 19 and 20 will disconnect the microphone M from the voice recorder circuit and will connect the output leads of the AVC unit 35 into said circuit. The contacts 17 and 18 of the gang switch G will connect the telephone voice signals from across the circuit of the receiver R to the input of the AVC unit 35, in which they will be subjected to "compression" to balance the recording volumes of the far and near ends of the line. The closing of the switch contact 16 will complete the circuit of the record-propelling motor and again start the rotation of the record (not shown). The closing of the switch contacts 14 and 15 will connect the warning signal generator across the telephone line through the wires 14a, 15a through the isolating condenser 46.

It will be understood that the motor 37 of the warning signal generator will be connected across the hold-in relay HR so that it will rotate only when said relay receives current.

When the user desires to terminate telephone recording, the "stop" push button 23 will be actuated, which will deenergize the relay HR and open the gang switch G. This operation will stop the warning signals and disconnect the telephone voice currents from the voice recorder 36. The microphone M will at the same time be again connected to the voice recorder so that normal dictation recording may be resumed.

After the telephone recording has terminated the disappearance of the characteristic warning signal from the line will definitely inform the parties of this termination.

When it is desired to use the dictating machine for the normal recording of dictation and conferences, it is desirable to be able to switch from the telephone recording condition in a simple and foolproof manner. This is accomplished by the arrangement herein disclosed, and it will be understood that if the user fails to actuate the "stop" button when the conversation is completed, the operation of restoring the telephone receiver to its hook will automatically perform this "stop" function. This construction thus affords protection against neglect and carelessness by the user.

One advantage of the present invention is that all parties to the telephone conversation are furnished with continuous knowledge that recording is actually being done, and the time when the recording has ceased.

A further advantage of the present invention is that in case the dry battery 10 should ever wear down, the switch $S_1$ and the hold-in relay HR will drop out before the motor will stop, thus insuring that no recording can take place with the battery too weak for operating the warning signal.

A still further advantage of the present invention is that when the record is reproduced, the warning signal will be audible, thus affording a permanent proof that all parties to the conversation knew that the conversation was being recorded.

*Second form*

In the modified form of the invention shown in Fig. 2, the connection to the telephone line is made through the switch S, and provision is made of a receiver R and a transmitter T, as in the first form. A warning signal generating coil 45 and associated isolating condenser 46 will also be connected by conductors 49b and 49c to the sides of the telephone line, as shown.

In this form of the invention, the current for a warning signal motor 54 is derived from the telephone line itself without the use of local dry cells.

Provision is also made of a relay TR, which includes a single-pole double-throw selector switch having a pair of fixed contacts 52, 53, between which is a pivoted iron armature equipped with a movable contact 51 having a manually-actuated push button 50 on the free end thereof. The contact 51 normally is held against the contact 52 by a tension coil spring 53a, thus short-circuiting the warning signal-operating motor 54 and the coil and condenser circuit of the relay TR. The motor 54 is connected in parallel with the coil of the relay TR.

It will be understood that when the relay push button 50 is depressed, the contact 51 will be separated from the contact 52, admitting direct current from the telephone line circuit to the motor 54, but this action can only occur when the telephone receiver R is off the hook, since when it is on said hook, the switch S will be open.

The contact 51 when closed will engage the contact 53, causing current to flow through the relay coil TR, thus magnetically holding the latter in closed condition, as shown by the dotted line in Fig. 2.

If the button 50 is pulled upwardly, the relay TR will open, and the contact 51 will again engage the contact 52. The relay will also "drop out" whenever the telephone receiver R is placed "on the hook."

By means of the above construction, it will be understood that the warning signal motor 54 will run whenever the button 50 is depressed, and the characteristic tune will be generated in the coil 45, and impressed across the telephone line through the condenser 46.

Resistors 55, 56 and a condenser 57 are employed in the motor circuit to filter out any interfering commutator "ripple" from the motor which might otherwise get into the telephone line and be recorded.

*Third form*

Figure 3:
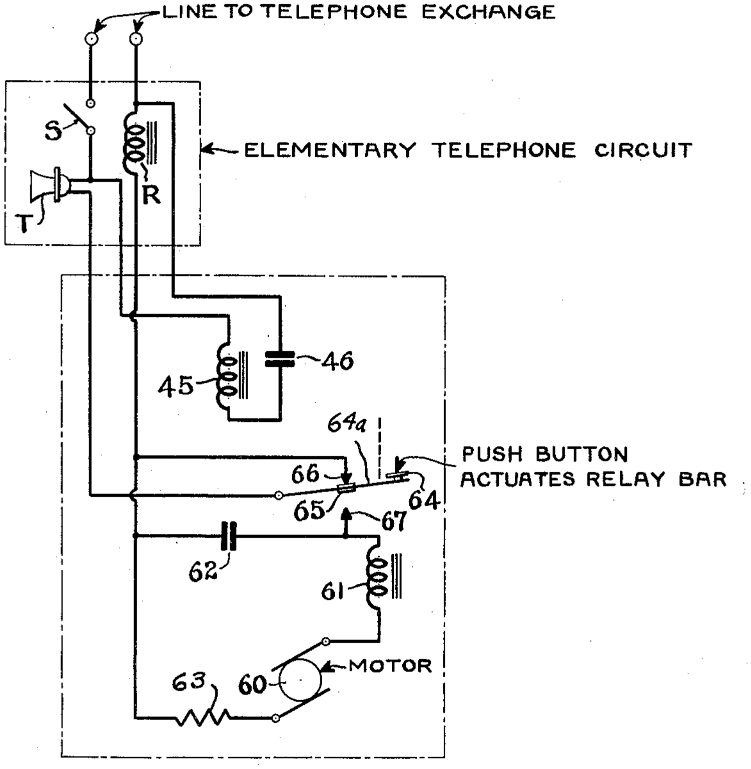
Fig. 3 is a view similar to Fig. 2 of a third form of the invention, in which the signal generating motor is operated from the telephone line current and is in series with the telephone relay coil.

In the modified form of the invention illustrated in the circuit diagram of Fig. 3, the receiver R, the transmitter T and the connection of the warning signal relay coil 45 and the isolating condenser 46 to the telephone line are the same as in Figs. 1 and 2.

In this form, however, a warning signal motor 60 is employed, which is in series with the coil 61 of the relay TR.

A condenser 62 and a resistance 63 similar to the condenser 57 and resistance 56 of the second form are also used. Provision is also made of a push button 64 carried by an iron switch arm 64*a* for swinging the movable contact 65 from the fixed contact 66 to the fixed contact 67, as in Fig. 2.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an apparatus for selectively recording normal dictation and telephone conversations, an electronic phonographic recorder, a microphone, a telephone circuit, switch means to simultaneously disconnect said microphone from said recorder and connect said telephone circuit to said recorder, means to generate and impress on said recorder a characteristic warning tune at regular repeated intervals during telephone recording to indicate that such recording is taking place, and a multiple pole-double-throw gang switch for simultaneously disconnecting said microphone from said recorder and connecting said telephone circuit and said warning signal generator to said recorder when shifting from normal dictation to telephone recording.

2. In an apparatus for selectively recording dictation and telephone conversations, a voice recorder, a microphone, a switch for shifting said microphone out of circuit with said voice recorder and applying voice currents emanating from a telephone line to said recorder, means for continually generating a characteristic warning signal current of low intensity and superimposing it upon the telephone voice currents when said apparatus is connected for telephone recording, a local dry battery to supply the voltage for operating said warning generator, and a circuit comprising a relay and said battery for operating said switch, whereby failure of said battery may prevent operation of said switch.

3. In an apparatus for selectively recording normal dictation and telephone conversations, a phonographic recorder, a telephone circuit including a receiver and a hook therefor, a microphone, means for connecting said microphone to said recorder during normal dictation, means for connecting said telephone circuit to said recorder and to simultaneously impress on said circuit a warning signal at regular repeated intervals that telephone recording is taking place, and means operated by the replacing of said receiver upon its hook to disconnect said telephone circuit from said recorder and automatically restore said apparatus into condition for normal dictation recording.

4. In an apparatus for selectively recording dictation and telephone conversation, a voice recorder, a microphone, a switch for shifting said microphone out of circuit with said voice recorder and applying voice currents emanating from a telephone line to said recorder, and means for continually generating a characteristic warning signal of low intensity and superimposing it upon the telephone voice currents when said apparatus is connected for telephone recording, said warning signal generating means comprising a motor-driven tuned plucked iron reed located in magnetic relation to a tone-generating coil connected to said recorder during telephone recording.

5. In an apparatus for selectively recording dictation and telephone conversations, a voice recorder, a microphone, a switch for shifting said microphone out of circuit with said voice recorder and applying voice currents emanating from a telephone line to said recorder, means for continually generating a characteristic warning signal current of low intensity and superimposing it upon the telephone voice currents when said apparatus is connected for telephone recording, a gang switch for simultaneously disconnecting said microphone from said recorder and connecting said recorder to said telephone circuit and said warning signal generator circuit, a hold-in relay for maintaining said gang switch in telephone-recording position, and manually operated start and stop switches to close and open the circuit through said hold-in relay whenever desired.

6. In an apparatus for selectively recording normal dictation and telephone conversations, a phonographic recorder, a telephone circuit including a receiver and a hook therefor, a microphone, means for connecting said microphone to said recorder for normal dictation, means for simultaneously connecting said telephone circuit to said recorder and disconnecting said microphone therefrom, and means operated by the manual replacing of said receiver upon its hook to disconnect said telephone unit from said recorder and automatically restore said microphone into condition for normal dictation recording.

LINCOLN THOMPSON.
DONALD F. BALMER.

(References on following page)

REFERENCES CITED

The following references are of record in the file of this patent:

UNITED STATES PATENTS

| Number | Name | Date |
|---|---|---|
| 1,548,028 | Egerton | Aug. 4, 1925 |
| 1,780,919 | Holland | Nov. 11, 1930 |
| 1,845,034 | Bickelhaupt | Feb. 16, 1932 |
| 2,278,828 | Chiardio | Apr. 7, 1942 |
| 2,319,665 | Dobrzensky | May 18, 1943 |
| 2,346,159 | Thompson | Jan. 25, 1944 |
| 2,355,504 | Bishop | Aug. 8, 1944 |